United States Patent
Mori

(10) Patent No.: US 8,662,115 B2
(45) Date of Patent: Mar. 4, 2014

(54) FUEL GAS STATION, FUEL GAS FILLING SYSTEM, AND FUEL GAS SUPPLYING METHOD

(75) Inventor: Tomoyuki Mori, Kawanishi (JP)

(73) Assignee: Toyota Jidosha Kabushiki Kaisha, Toyota-shi, Aichi (JP)

(*) Notice: Subject to any disclaimer, the term of this patent is extended or adjusted under 35 U.S.C. 154(b) by 23 days.

(21) Appl. No.: 13/556,287

(22) Filed: Jul. 24, 2012

(65) Prior Publication Data

US 2013/0014854 A1    Jan. 17, 2013

Related U.S. Application Data

(63) Continuation of application No. PCT/JP2010/069253, filed on Oct. 29, 2010.

(30) Foreign Application Priority Data

Jan. 25, 2010 (JP) .................................. 2010-012938

(51) Int. Cl.
  *B65B 1/30* (2006.01)
  *B67D 7/34* (2010.01)
(52) U.S. Cl.
  CPC .................................. *B67D 7/348* (2013.01)
  USPC ....... 141/94; 141/2; 141/82; 141/83; 141/192
(58) Field of Classification Search
  USPC .................. 141/2, 82, 83, 94, 192
  See application file for complete search history.

(56) References Cited

U.S. PATENT DOCUMENTS

| 5,628,349 | A  | * | 5/1997 | Diggins et al. | 141/3 |
| 6,619,336 | B2 | * | 9/2003 | Cohen et al. | 141/83 |
| 7,861,748 | B2 | * | 1/2011 | Iida | 141/95 |
| 8,365,777 | B2 | * | 2/2013 | Farese et al. | 141/4 |
| 8,534,327 | B2 | * | 9/2013 | Inagi et al. | 141/4 |
| 2004/0182470 | A1 | * | 9/2004 | White | 141/11 |
| 2010/0032934 | A1 | * | 2/2010 | Veenstra | 280/834 |

FOREIGN PATENT DOCUMENTS

| JP | 6-119068 | 4/1994 |
| JP | 9-72610 | 3/1997 |
| JP | 2003-232497 | 8/2003 |
| JP | 2005-053358 | 3/2005 |

(Continued)

OTHER PUBLICATIONS

International Search Report in International Application No. PCT/JP2010/069253; Mailing Date: Nov. 22, 2010.

*Primary Examiner* — Timothy L Maust
(74) *Attorney, Agent, or Firm* — Finnegan, Henderson, Farabow, Garrett & Dunner, LLP

(57) ABSTRACT

A fuel gas station, a fuel gas filling system, and a fuel gas filling method which can check whether information on temperature of the inside of a fuel tank is correct, so that a fuel tank is properly filled. The fuel gas station calculates a difference of temperature between a temperature of the inside of the fuel tank and a temperature of fuel gas to be supplied to the fuel tank after supplying of fuel gas for a predetermined length of time. When the calculated difference of temperature exceeds a predetermined threshold value, the fuel gas station determines that the information on temperature of the inside of the fuel tank is abnormal, and reduces at least one of supply flow and supply quantity of fuel gas as compared to when such information is normal.

11 Claims, 7 Drawing Sheets

(56) References Cited

FOREIGN PATENT DOCUMENTS

| JP | 2006-214512 | 8/2006 |
| JP | 2007-24152 | 2/2007 |
| JP | 2009-108926 | 5/2009 |
| JP | 2009-127853 | 6/2009 |

* cited by examiner

FUEL GAS STATION, FUEL GAS FILLING SYSTEM, AND FUEL GAS SUPPLYING METHOD

CROSS-REFERENCE TO RELATED APPLICATIONS

This application is a continuation of International Application No. PCT/JP2010/069253, filed Oct. 29, 2010, and claims the priority of Japanese Application No. 2010-012938, filed Jan. 25, 2010, the content of both of which is incorporated herein by reference.

TECHNICAL FIELD

The present invention relates to a fuel gas station which supplies fuel gas to a fuel tank such as vehicle-mounted one.

BACKGROUND ART

As this kind of fuel gas station, a hydrogen station is known which fills a hydrogen tank of a fuel-cell vehicle with hydrogen gas. The supply quantity of hydrogen gas discharged by the hydrogen station is regulated by a regulator (refer to Japanese Patent Laid-Open No. 2003-232497, for example), or the flow or the pressure thereof is regulated (refer to Japanese Patent Laid-Open No. 2009-127853, for example), whereby the hydrogen tank is filled with hydrogen gas.

SUMMARY OF INVENTION

Technical Problem

When a temperature sensor is disposed in the inside of a hydrogen tank and the temperature of the inside of the hydrogen tank is acquired at the start of filling, the remaining quantity thereof can be calculated based on the pressure in the inside of the hydrogen tank separately acquired. Also, when such temperature sensor is used, temperature management can be performed during a filling operation so that the temperature of the inside of the hydrogen tank rising in association with the filling operation does not exceed a threshold limit value.

However, when the temperature sensor has a trouble caused by a drift or the like, the temperature of the inside of the hydrogen tank cannot be accurately measured and thus the remaining quantity at the start of filling cannot be correctly acquired. When a measured temperature is lower than the actual temperature, the threshold limit temperature may be exceeded during the filling operation. By contrast, when a measured temperature is higher than the actual temperature, it is erroneously determined that the threshold limit temperature has been reached and thus the filling operation is finished before a predetermined amount of gas is filled.

An object of the present invention is to provide a fuel gas station, a fuel gas filling system, and a fuel gas supplying method which can check whether information on temperature of the inside of a fuel tank is correct, so that a fuel tank is properly filled.

Solution to Problem

To attain the above object, the present invention provides a fuel gas station which supplies fuel gas to an external fuel tank, the station including: a first temperature acquiring unit which acquires information on temperature of the inside of the fuel tank; a second temperature acquiring unit which acquires information on temperature of fuel gas which the fuel gas station supplies to the fuel tank; a calculation unit which calculates based on results acquired by the first temperature acquiring unit and the second temperature acquiring unit after supplying of fuel gas for a predetermined length of time, a difference of temperature between the temperature (hereinafter referred to as an "tank temperature") of the inside of the fuel tank and the temperature (hereinafter referred to as an "supply temperature") of fuel gas supplied to the fuel tank; a determination unit which determines that the information on temperature of the inside of the fuel tank is abnormal when the calculated difference of temperature exceeds a predetermined threshold value; and an operation control unit which reduces at least one of the flow and the amount of fuel gas supplied to the fuel tank as compared to when the information on temperature of the inside of the fuel tank is normal.

According to the present invention, more accurate determination can be made as compared to when correctness is determined, for example, based only on information on temperature of the inside of the fuel tank. Furthermore, in the supplying of fuel gas by the fuel gas station, the correctness of information on temperature of the inside of the fuel tank disposed in the outside of the fuel gas station can also be checked. Accordingly, for example, when the fuel tank is mounted in the vehicle, the above determination can also be made every time fuel gas is supplied by the fuel gas station, without bringing the vehicle into a shop for the purpose of a periodic inspection or the like. And when it is determined that information on temperature of the inside of the fuel tank is abnormal, fuel gas is suppressed from being excessively supplied to the fuel tank.

Preferably, the operation control unit stops supplying fuel gas to the fuel tank when it is determined that the information on temperature of the inside of the fuel tank is abnormal.

Preferably, the predetermined threshold value varies according to characteristics related to the fuel tank. Preferably, when the fuel tank is mounted in a movable body, the predetermined threshold value varies according to at least one of outdoor air temperature, the running state or the running area of the movable body, and the consumption state of fuel gas in the movable body immediately before fuel gas is supplied for the predetermined length of time.

With this configuration, the correctness of information on temperature of the inside of the fuel tank can be accurately determined as compared to when a fixed threshold value is used. For example, a threshold value may be used which is obtained by considering, for the characteristics related to the fuel tank, specifications of the fuel tank (such as heat radiation characteristics or thermal insulation performance), or the mounting place of the fuel tank (the degree of effect of a blowing wind, the presence of peripheral thermal sources or the like) when the fuel tank is mounted in a movable body.

Preferably, the first temperature acquiring unit and the second temperature acquiring unit acquire respective pieces of information on temperature when supplying of fuel gas for the predetermined length of time is performed at a supply flow smaller than when supplying is normally performed.

With this configuration, when supply flow is smaller, a rise of temperature of the inside of the fuel tank associated with supplying of fuel gas is suppressed. Accordingly, in a process in which it is determined whether information on temperature of the inside of the fuel tank is correct, the state of the inside of the fuel tank can be suppressed from exceeding the threshold limit value. Further, a process of preliminarily setting the above predetermined threshold value based on evaluation or simulation can also be simplified.

Here, even when supplying of fuel gas is performed at a smaller flow, the temperature of the inside of the fuel tank rises and thus the tank temperature may become higher than the supply temperature. Accordingly, when the acquired results are opposite to the above, the information on temperature of the inside of the fuel tank may be incorrect.

Thus, in a preferred aspect of the present invention, when results acquired by the first temperature acquiring unit and the second temperature acquiring unit indicate that the tank temperature is lower than the supply temperature, the determination unit determines that the information on temperature of the inside of the fuel tank is abnormal.

With this configuration, the presence/absence of abnormality can be easily determined.

In another preferred aspect of the present invention, the fuel gas station further includes a precooler which cools fuel gas supplied to the fuel tank, and a third temperature acquiring unit which acquires information on outdoor air temperature. When results acquired by the first temperature acquiring unit and the third temperature acquiring unit after supplying fuel gas for a predetermined length of time indicate that the tank temperature exceeds the outdoor air temperature, the determination unit determines that the information on temperature of the inside of the fuel tank is abnormal.

With this configuration, the presence/absence of abnormality can be easily determined.

Preferably, the first temperature acquiring unit acquires, as information on temperature of the inside of the fuel tank via communication, detection results of a temperature sensor disposed in the inside of the fuel tank.

With this configuration, the presence/absence of abnormality of the temperature sensor disposed in the inside of the fuel tank can be determined at the fuel gas station.

Preferably, the fuel gas station includes a nozzle used to discharge fuel gas into the fuel tank, and the second temperature acquiring unit comprises a temperature sensor disposed in the nozzle.

With this configuration, an actual temperature of fuel gas supplied can be acquired using a simpler structure.

A fuel gas filling system according to the present invention includes the inventive fuel gas station described above and a movable body mounted with a fuel tank.

The present invention provides a fuel gas supplying method by which a fuel gas station supplies fuel gas to a fuel tank lying outside the fuel gas station, the method including: a step of supplying fuel gas to the fuel tank for a predetermined length of time; a step which, in the supplying of fuel gas, detects a temperature of the inside of the fuel tank and a temperature of fuel gas supplied by the fuel gas station to the fuel tank and calculates a difference of temperature therebetween; and a step which, when the calculated difference of temperature exceeds a predetermined threshold value, determines that the detected information on temperature of the inside of the fuel tank is abnormal and reduces at least one of supply flow and supply quantity of fuel gas supplied to the fuel tank as compared to when the information on temperature of the inside of the fuel tank is normal.

EMBODIMENTS FOR CARRYING OUT THE INVENTION

Preferred embodiments of the present invention will be described below with reference to the accompanying drawings. Here, as a fuel gas filling system, an example will be described in which a hydrogen station fills, with hydrogen gas, a fuel tank of a fuel-cell vehicle mounted with a fuel-cell system. The fuel-cell system includes, as is known in the art, a fuel cell in which electrochemical reaction of fuel gas (hydrogen gas, for example) and oxidizing gas (air, for example) generates power. The filling of hydrogen gas is one aspect of the present invention in which hydrogen gas is supplied from the hydrogen station to the fuel tank.

Figure 1:
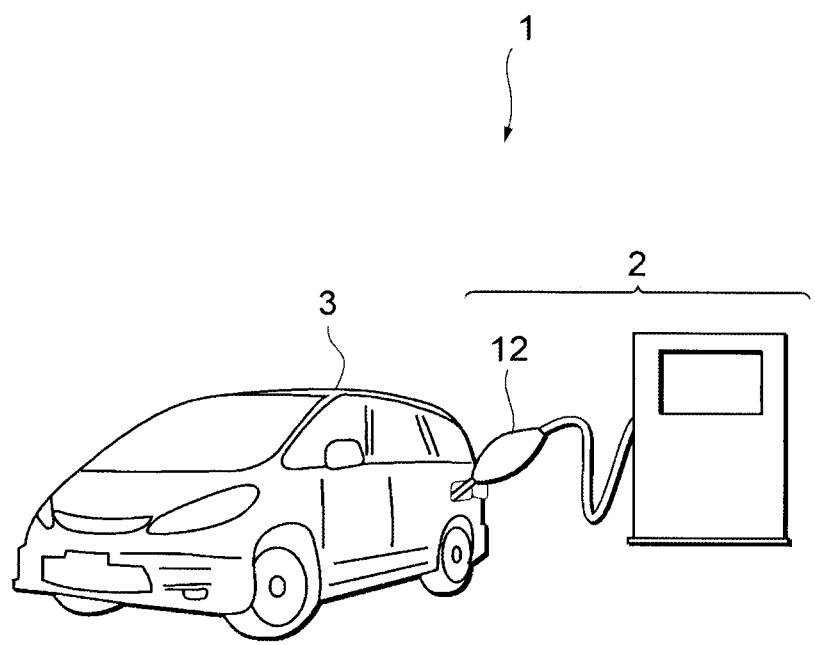
FIG. 1 is a schematic view of a fuel gas filling system according to an embodiment.

A fuel gas filling system 1 includes, as illustrated in FIG. 1, a hydrogen station 2 acting as a fuel gas station and a vehicle 3 which receives hydrogen gas from the hydrogen station 2.

Figure 2:
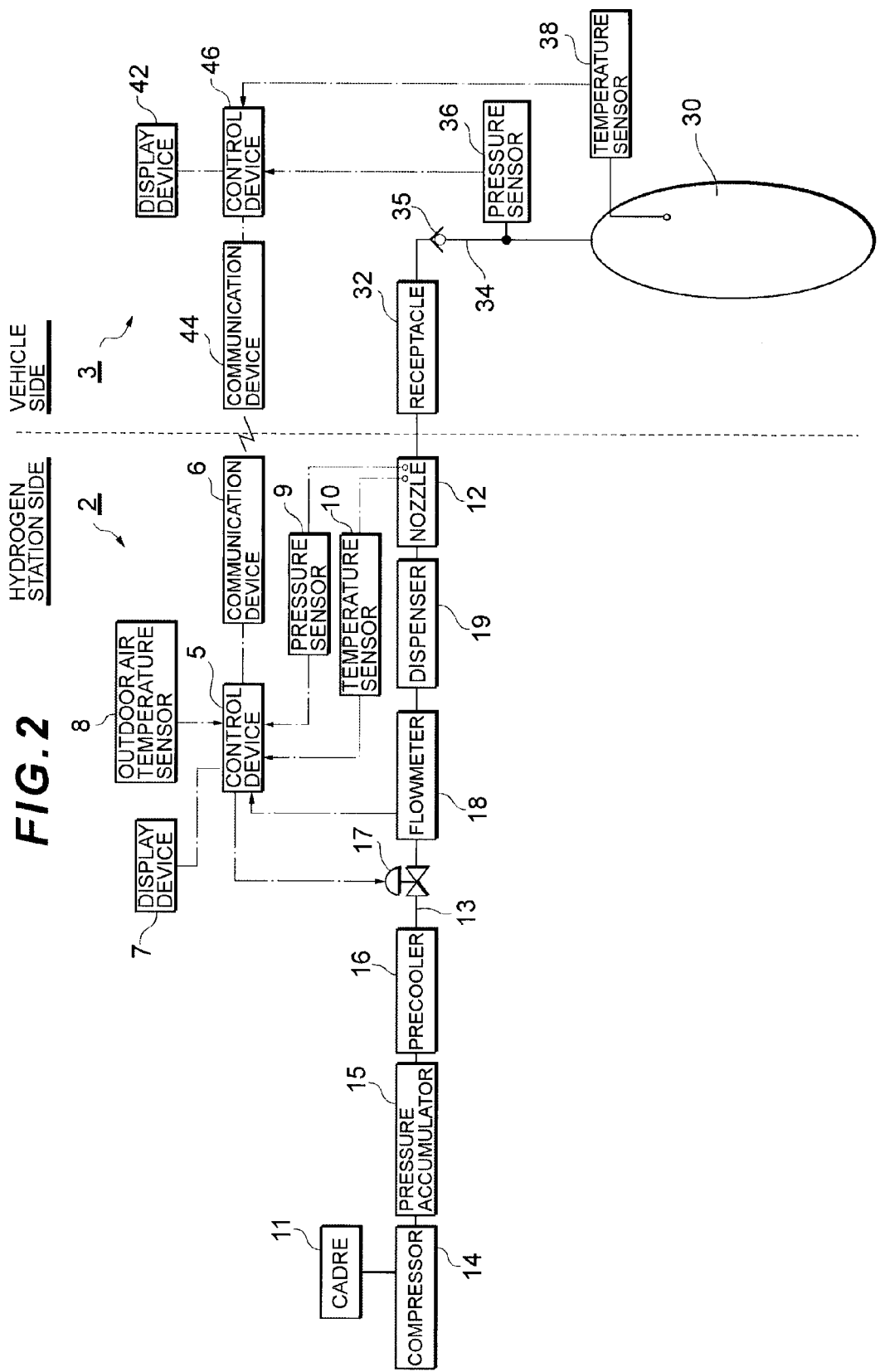
FIG. 2 is a view illustrating a configuration of the fuel gas filling system according to the embodiment.

The vehicle 3 includes, as illustrated in FIG. 2, a fuel tank 30, a receptacle 32, a pressure sensor 36, a temperature sensor 38, a display device 42, a communication device 44 and a control device 46.

The fuel tank 30 acting as a supply source of fuel gas to the fuel cell is a high-pressure gas tank which can accumulate hydrogen gas such as 35 MPa or 70 MPa. When a plurality of fuel tanks 30 are mounted, the fuel tanks 30 are connected in parallel to the fuel cell. Hydrogen gas in the inside of the fuel tank 30 is supplied to the fuel cell via a supply pipe line (not illustrated). In supplying hydrogen gas to the fuel tank 30, hydrogen gas is sent from the hydrogen station 2 via the receptacle 32 to a filling flow path 34. The filling flow path 34 comprises a gas piping arranged outside the fuel tank 30 and a flow path part arranged in the inside of a valve assembly (not illustrated) mounted in a mouth part of the fuel tank 30. The filling flow path 34 is provided with a one-way valve 35 used to prevent reverse flow of hydrogen gas.

The pressure sensor 36 used to detect a pressure of hydrogen gas discharged by the hydrogen station 2 is disposed in the filling flow path 34. For example, the pressure sensor 36 is disposed in the gas piping which lies in the downstream side relative to the one-way valve 35 and immediately before the fuel tank 30, and thus detects a pressure substantially reflecting the pressure (hereinafter referred to as a "tank pressure") of hydrogen gas in the inside of the fuel tank 30.

The temperature sensor 38 is disposed in the flow path part arranged in the inside of the valve assembly, that is, disposed in the inside of the fuel tank 30. The temperature sensor 38 detects a temperature reflecting the temperature (hereinafter referred to as a "tank temperature $T_2$") of hydrogen gas in the inside of the fuel tank 30. According to another embodiment, the pressure sensor 36 may be disposed in the inside of the fuel tank 30. The position of the temperature sensor 38 in the fuel tank 30 is not particularly limited as long as tank temperature $T_2$ can be substantially detected; but the temperature sensor 38 is preferably disposed close to a blowout mouth of hydrogen gas into the fuel tank 30.

The display device 42 is a display which can also be used, for example, as a part of a car navigation system, and displays various pieces of information on its screen. The communication device 44 is used by the vehicle 3 to communicate with the hydrogen station 2, and includes, for example, a communication interface for performing radio communication such as ultrared communication. The communication device 44 is incorporated in the receptacle 32 so that communication becomes ready when a filling nozzle 12 of the hydrogen station 2 is connected to the receptacle 32, or is fixedly disposed in the inside of a lid box of the vehicle 3. The control device 46, formed as a microcomputer including CPU, ROM and RAM, controls the vehicle 3. The control device 46 is connected to the pressure sensor 36, the temperature sensor 38, the display device 42, the communication device 44 and the like, and sends via the communication device 44 to the hydrogen station 2, information capable of being captured in the vehicle 3 such as information detected by the pressure sensor 36 and the temperature sensor 38.

The hydrogen station 2 includes a control device 5 which controls the devices disposed in the hydrogen station 2, a communication device 6 used to communicate with the vehicle 3, a display device 7 which displays various pieces of information on its screen, and an outdoor air temperature sensor 8 used to detect an outdoor air temperature in the location of placement of the hydrogen station 2. The communication device 6, based on a system corresponding to the communication device 44 of the vehicle 3, sends and receives various pieces of information to/from the communication device 44. The display device 7 displays information such as filling flow (filling speed) and filling quantity during a filling operation. The display device 7 may further include an operating panel, appearing on its display screen, used to select or specify a desired filling quantity and the like.

The hydrogen station 2 further includes a cadre (gas supply source) 11 which accumulates hydrogen gas, a filling nozzle 12 used to discharge hydrogen gas into the fuel tank 30 of the vehicle, and a gas flow path 13 used to connect them. The filling nozzle 12, a component also called a filling coupling, is connected to the receptacle 32 of the vehicle 3 in a filling operation of hydrogen gas. The filling nozzle 12 and the receptacle 32 constitute a connection unit which connects the hydrogen station 2 and the fuel tank 32. In the filling nozzle 12, a pressure sensor 9 and a temperature sensor 10 are provided which detect a pressure and a temperature (hereinafter referred to as a "supply pressure" and a "supply temperature $T_1$", respectively) of hydrogen gas which the hydrogen station 2 supplies to the fuel tank 30. When these sensors 9 and 10 are disposed in the filling nozzle 12, the actual pressure and the actual temperature of hydrogen gas actually supplied by the hydrogen station 2 to the fuel tank 30 can be acquired using a simpler structure. More preferably, the temperature sensor 10 is mounted at the tip end (a part of the filling nozzle 12 on the side of the fuel tank 30) of the filling nozzle 12.

Disposed in the gas flow path 13 are a compressor 14, a pressure accumulator 15, a precooler 16, a flow control valve 17, a flowmeter 18 and a dispenser 19. The compressor 14 compresses hydrogen gas from the cadre 11 and discharges the hydrogen gas. The pressure accumulator 15 accumulates the hydrogen gas with its pressure raised to a given level by the compressor 14. The precooler 16 receives the hydrogen gas of a room temperature from the pressure accumulator 15 and cools the hydrogen gas to a predetermined low temperature (−20° C., for example). The flow control valve 17 is an electrically driven valve and regulates, based on an instruction form the control device 5, the flow of the hydrogen gas from the pressure accumulator 15 so that the filling flow of hydrogen gas to the fuel tank 30 is regulated. The regulated filling flow is measured by the flowmeter 18. In response to the measurement results, the control device 5 controls the flow control valve 17 through feedback so that a desired filling flow is provided. A flow control device other than the flow control valve 17 may also be used. The dispenser 19 is used to send out the hydrogen gas to the filling nozzle 12. For example, when a trigger lever of the filling nozzle 12 is pulled, the dispenser 19 is initiated and thus the hydrogen gas can be discharged from filling nozzle 12 into the fuel tank 30. Though not illustrated, a cutoff valve which opens the gas flow path 13 during filling is arranged in the pressure accumulator 14 or in the downstream side thereof.

The control device 5 is formed as a microcomputer including a CPU, ROM and RAM. The CPU executes, according to control programs, desired calculations to perform various types of processings and control operations. The ROM stores the control programs and control data used by the CPU. The RAM is mainly used as a working area for various types of operations. The control device 5 is electrically connected via control lines shown by the dashed-dotted lines in FIG. 2 to the communication device 6, the display device 7, the outdoor air temperature sensor 8, the pressure sensor 9, the temperature sensor 10, the flow control valve 17 and the flowmeter 18, and also to the pressure accumulator 15 and the like. For example, the control device 5 recognizes a pressure and temperature detected by the pressure sensor 36 and the temperature sensor 38 as the pressure and temperature of the inside of the fuel tank 30 (that is, tank pressure and tank temperature $T_2$), and then controls the filling of hydrogen gas. To be more in detail, the control device 5 regulates the degree of opening of the flow control valve 17 based on information on tank pressure and tank temperature $T_2$ on the side of the vehicle 3 received from the communication device 6. The control device 5 sends via the communication device 6 to the vehicle 3, information which can be captured in the hydrogen station 2.

Figure 3:
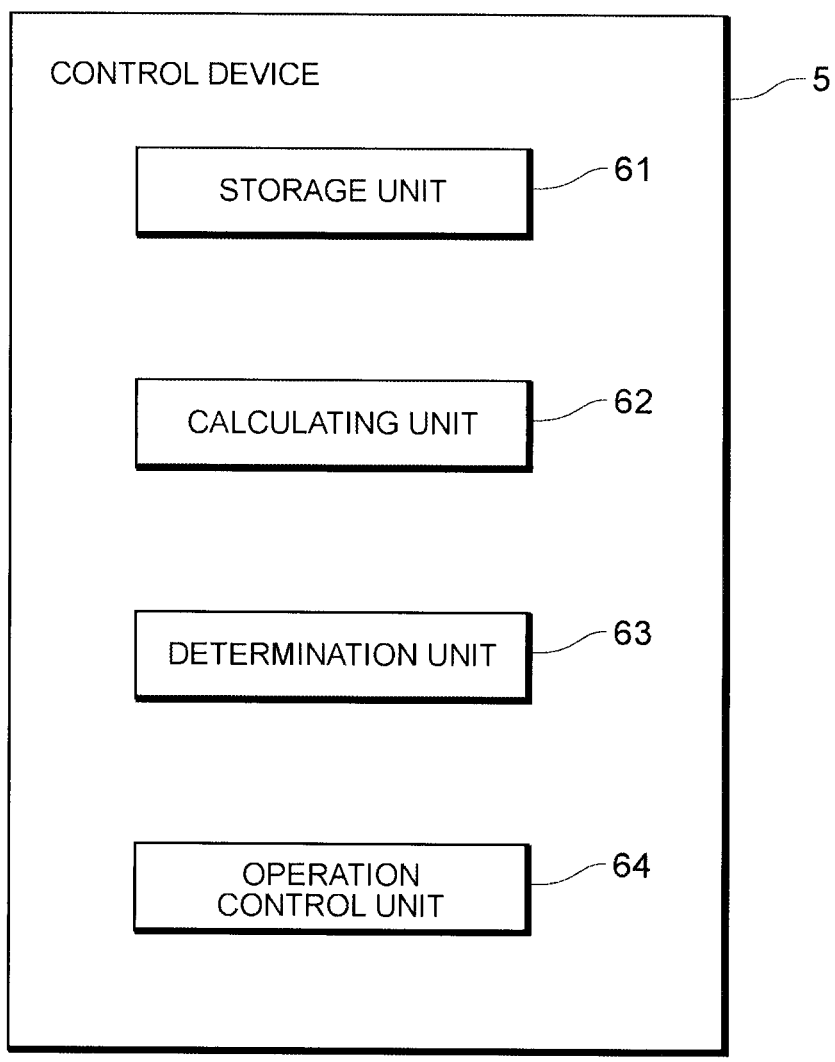
FIG. 3 is a function block diagram of a control device of a fuel gas station according to the embodiment.

The control device 5 includes, as illustrated in FIG. 3, a storage unit 61, a calculating unit 62, a determination unit 63 and an operation control unit 64. These units are function blocks for determining the presence/absence of abnormality of the temperature sensor 38 on the side of the vehicle 3. The storage unit 61, comprising the above described ROM and RAM, preliminarily stores a filling flow map used during filling, a threshold value used for abnormality determination of the temperature sensor 38, and the like. As described later in detail, the calculating unit 62 calculates a difference of temperature between supply temperature $T_1$ and tank temperature $T_2$. The determination unit 63 determines presence/absence of abnormality of the temperature sensor 38. The operation control unit 64 controls filling of hydrogen gas into the fuel tank 30. For example, the operation control unit 64 sends based on the filling flow map read out from the storage unit 61, control instructions to the related devices and thereby controls the related devices so that filling of hydrogen gas is performed.

In the fuel gas filling system 1 described above, when the vehicle 3 is filled with hydrogen gas, first of all, the filling nozzle 12 is connected with the receptacle 32. In this state, the dispenser 19 is initiated. As a result, hydrogen gas is discharged from the filling nozzle 12 into the fuel tank 30 to fill the fuel tank 30.

In the fuel gas filling system 1 and the fuel gas supplying method according to the present embodiment, the hydrogen station 2 determines presence/absence of abnormality of the temperature sensor 38 at the initial stage of filling, so that filling of hydrogen gas to the fuel tank 30 is performed in a manner adapted to the fuel tank 30.

Figure 4:
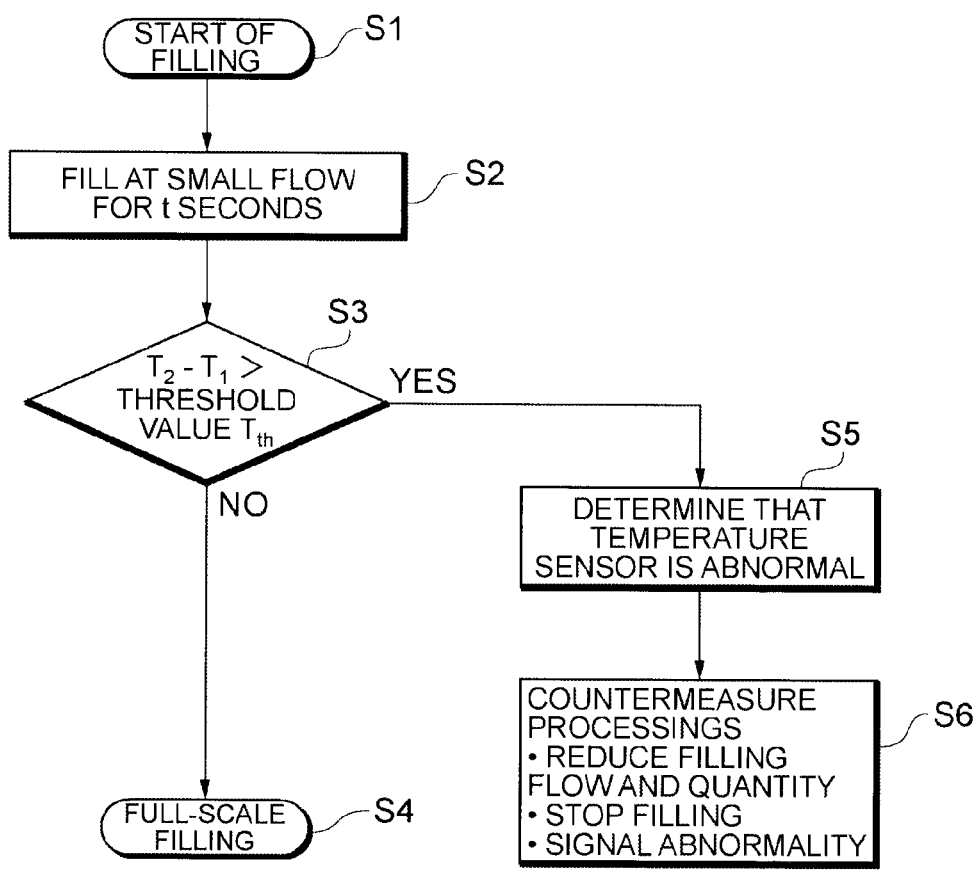
FIG. 4 is a flowchart showing a filling procedure of the fuel gas filling system according to the embodiment.

A filling procedure in the fuel gas filling system 1 will be described with reference to FIG. 4.

In this filling procedure, it is assumed that the temperature sensor 10 on the side of the hydrogen station 2 is in a normal state. That is, abnormality of the temperature sensor 10 can be checked on the side of the hydrogen station 2 using another method.

A filling operator performs an operation of connecting the filling nozzle 12 and the receptacle 32 and starts a filling operation which permits discharging of hydrogen gas from the hydrogen station 2 to fuel tank 30. Consequently, filling of hydrogen gas is initiated (step S1).

In this initial stage of filling from the filling initiation until a predetermined length of time (t seconds) has elapsed, the filling of hydrogen gas is performed at a low speed (step S2).

Here, the predetermined length of time (t seconds) may be a length which allows the temperature sensors 10 and 38 to detect supply temperature $T_1$ and tank temperature $T_2$ and also allows the information on tank temperature $T_2$ detected to be transmitted via communication to the hydrogen station 2. Preferably, the predetermined length of time is minimized, and several tens of seconds, for example.

The low speed in the initial stage of filling is set lower than a filling speed (supply speed) for the full-scale filling (step S4). Preferably, the low speed is set substantially low so that the gas temperature of the inside of the fuel tank 30 hardly rises. In a preferred example, the filling speed in the initial stage of filling is set to one-tenth or one-twentieth the filling speed for the full-scale filling. The value of the low filling speed may be variable, but preferably fixed.

In the subsequent step S3, a difference of temperature $\Delta T(=T_2-T_1)$ between supply temperature $T_1$ and tank temperature $T_2$ is calculated, and the calculated difference of temperature $\Delta T$ is compared with threshold value $T_{th}$ (step S3). This step S3 is executed in the above described initial stage of filling.

Here, the calculation of difference of temperature $\Delta T$ will be specifically described.

In the initial stage of filling, first, information on supply temperature $T_1$ and information on tank temperature $T_2$ are acquired. Here, the information on supply temperature $T_1$ is acquired by the temperature sensor 10 and directly sent from the temperature sensor 10 to the control device 5. However, the information on tank temperature $T_2$ is detected by the temperature sensor 38 and transmitted via the control device 46, the communication device 44 and the communication device 6 and then sent from the communication device 6 to the control device 5. The calculating unit 62 calculates a difference of temperature $\Delta T$ based on the acquired results of the information on supply temperature $T_1$ and tank temperature $T_2$ sent to the control device 5. The difference of temperature $\Delta T$ is a value obtained by subtracting supply temperature $T_1$ from tank temperature $T_2$, for example, after a predetermined length of time (t seconds) has elapsed, or at a given timing in the course of the elapsed time.

Here, just in case, the relationship with the descriptions given in the claims described later will be described. In the present embodiment, the temperature sensor 10 corresponds to a "second temperature acquiring unit" described in the claims. Similarly, the communication device 6 acquiring via communication the detection result of the temperature sensor 38 as information on tank temperature $T_2$ corresponds to a "first temperature acquiring unit" described in the claims.

After the calculation of the difference of temperature $\Delta T$, the determination unit 63 determines whether the difference of temperature $\Delta T$ exceeds the threshold value $T_{th}$ (step S3).

Here, in the initial stage of filling, when filling is, as described above, performed at a substantially low speed so that gas temperature of the inside of the fuel tank 30 hardly rises, supply temperature $T_1$ is approximately equal to tank temperature $T_2$; these temperatures are equal to a temperature (−20° C. in the above described example) being the result of cooling by the precooler 16. Here, a low filling speed is used so that the gas temperature of the inside of the fuel tank 30 hardly rises, but the hydrogen gas supplied into the fuel tank 30 expands. Thus the gas temperature may rise to some extent. Accordingly, at the normal state, tank temperature $T_2$ may be slightly higher than supply temperature $T_1$, but supply temperature $T_1$ is never higher than tank temperature $T_2$.

In view of the above, 0 (zero) may be used as threshold value $T_{th}$ compared to difference of temperature $\Delta T$. But, when the above described small rise in temperature is considered, a value greater than 0 (5° C. or the like, for example) is preferably used as threshold value $T_{th}$. More preferably, a value obtained by giving a margin to the above described small rise in temperature (7° C. or the like, for example) is used as threshold value $T_{th}$. This rise in temperature may be calculated by means of evaluation results, simulation or the like.

In addition, threshold value $T_{th}$ may be set to a fixed value, but preferably varies according to characteristics related to the fuel tank 30.

To be more in detail, the heat radiation characteristics, the heat insulation characteristics and the rise rate of temperature of the fuel tank 30 vary depending on its material, surface area, structure and the like. For example, when aluminum is used for the liner of the fuel tank 30, its heat radiation characteristics are improved as compared to when plastics (polyethylene or the like) is used. Further, the heat radiation characteristics and the like also vary depending on the characteristics and compounding ratio of the plastics in the liner of plastics. In addition, the cooling characteristics of the fuel tank 30 also varies depending on the location of placement of the fuel tank 30 in the vehicle 3, that is, on the degree of effect of a blowing wind, the presence of peripheral thermal sources, or the like. In this way, characteristics such as the heat radiation characteristics of the fuel tank 30 itself, and characteristics affecting the fuel tank 30 are not always constant in modern or future vehicles or fuel tanks.

Thus, in a preferred aspect of the present embodiment, a value obtained by considering the above characteristics related to the fuel tank 30 mounted in the vehicle 3 may be used as threshold value $T_{th}$. For example, in the fuel tank 30 having a liner of aluminum, threshold value $T_{th}$ can be set smaller than in the fuel tank 30 having a liner of plastics.

Threshold value $T_{th}$ may be preliminarily stored in the storage unit 61. However, when threshold value $T_{th}$ is varied according to characteristics related to the fuel tank 30, information on these characteristics needs to be inputted to the hydrogen station 2. Preferably, communication is used as a method for implementing this. More specifically, information on characteristics related to the fuel tank 30 is stored in the storage unit of the control device 46 of the vehicle 3 and in the initial stage of filling, this information is sent via communication between the communication device 44 and the communication device 6 to the control device 5 of the hydrogen station 2. With this configuration, while information on characteristics related to the fuel tank 30 is not preliminarily stored on the side of the hydrogen station 2, threshold value $T_{th}$ dependent on the characteristics related to the fuel tank 30 can be determined and used in the hydrogen station 2 in the initial stage of filling.

As a result of step S3, when the difference of temperature $\Delta T$ is equal to or smaller than threshold value $T_{th}$ (step S3; NO), it is determined that the temperature sensor 38 is normal, and the operation control unit 64 initiates the full-scale filling (step S4). In this full-scale filling, with reference to information on tank pressure, tank temperature $T_2$ and the like received via communication from the side of the vehicle 3 at the beginning or end of the initial stage of filling, the operation control unit 64 consults the filling flow map stored in the storage unit 61 for an optimum filling flow to the fuel tank 30 and regulates the degree of opening of the flow control valve 17.

On the contrary, as a result of step S3, when the difference of temperature $\Delta T$ exceeds threshold value $T_{th}$ (step S3; YES), it is determined that the temperature sensor 38 is abnormal (step S5). That is, the determination unit 63 determines that information on temperature of the inner side of the fuel tank 30 acquired in the initial stage of filling is abnormal.

When it is determined that the temperature sensor 38 is abnormal, the fuel gas filling system 1 executes required countermeasure processings (step S6). For example, the operation control unit 64 reduces at least one of filling flow (supply flow) and filling quantity (supply quantity) as compared to when the full-scale filling (step S4) is performed. By way of example, the operation control unit 64 selects a filling flow (supply flow) smaller than that selected based on the filling flow map in the full-scale filling and thereby performs filling so that the fuel tank 30 is not overloaded. In this case, a filling flow or a filling quantity on the side of prudence may be selected without using communication. In another exemplary countermeasure processing, the operation control unit 64 may terminate the filling of hydrogen gas to the fuel tank 30.

Separately from or in combination with the above described countermeasure processings for filling, a countermeasure processing for signaling determination of abnormality may be executed. By way of example, information on abnormality of the temperature sensor 38 or information indicating that the temperature sensor 38 is in need of repair may be displayed on at least one of the display device 7 and the display device 42. In addition, as a countermeasure processing, a history of determination of abnormality of the temperature sensor 38 may be stored in the storage units of the control devices 5 and 46.

In the present embodiment described above, at the start of filling, presence/absence of abnormality of the temperature sensor 38 on the side of the vehicle 3 can be determined on the side of the hydrogen station 2 by use of filling from the hydrogen station 2. Particularly, the presence/absence of abnormality of the temperature sensor 38 is determined by comparing a difference between filling supply temperature $T_1$ and tank temperature $T_2$ with threshold value $T_{th}$. Thus the determination can be made more accurately than when the determination is made based only on information on tank temperature $T_2$.

Further, it can be checked whether the information on temperature of the inside of the fuel tank 30 is correct. Thus, filling can be properly performed so that a threshold limit temperature of the fuel tank 30 is not exceeded. For example, when it is determined that the temperature sensor 38 is abnormal, it is possible to keep on filling the fuel tank 30 so that filling is not performed at a filling flow and at a filling quantity more than needs.

In addition, the filling flow used in determining presence/absence of abnormality of the temperature sensor 38 is set to a small value. Thus, in this determination process, the state of the inside of the fuel tank 30 can be suppressed from exceeding a threshold limit value. Further, when this small filling flow is set to a level so that the gas temperature of the inside of the fuel tank 30 hardly rises, evaluation tests and simulation process for determining threshold value $T_{th}$ can be simplified.

<Variation>

Several variations of the present embodiment will be described.

<First Variation>

Figure 5:
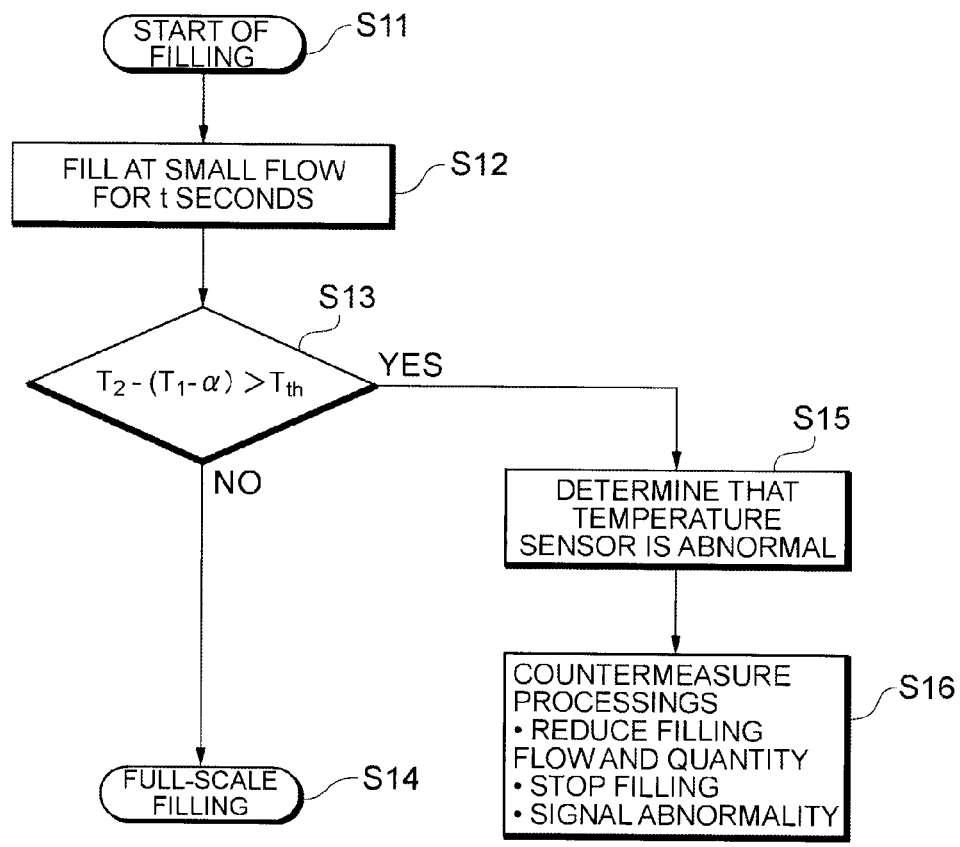
FIG. 5 is a flowchart showing a filling procedure of a first variation according to the embodiment.

The difference of a first variation illustrated in FIG. 5 from the above embodiment lies in that step S3 is replaced by step S13. Steps S11, S12 and S14 to S16 are the same as steps S1, S2 and S4 to S6 and hence detailed explanation thereof is omitted here.

In step S13, similarly to Step S3, a difference of temperature between supply temperature $T_1$ and tank temperature $T_2$ is calculated and compared to threshold value $T_{th}$; but in this calculation, a given value $\alpha$ is subtracted from supply temperature $T_1$. The reason for this will be described in detail below.

When the vehicle 3 runs at a high load, the fuel cell consumes much hydrogen gas and thus much hydrogen gas is discharged from the fuel tank 30 to the fuel cell. This discharge lowers tank temperature $T_2$. Consequently, when the vehicle 3 is filled with hydrogen gas at the hydrogen station 2 just after running at a high load in a cold environment, it may be detected that supply temperature $T_1$ is higher than tank temperature $T_2$ in the initial stage of filling. As a result, when step S3 shown in FIG. 4 is performed without considering this fact, the full-scale filling may be performed while abnormality caused by drift has occurred in the temperature sensor 38. Thus, in the present embodiment, when filling is performed after the vehicle 3 has run at a high load in a cold environment, the filling procedure of FIG. 5 is used, that is, a value of $\alpha$ is subtracted from supply temperature $T_1$ (step S13).

Here, when the formula shown in step S13 is transformed, the following formula (1) is provided.

$$T_2-T_1 > T_{th} - \alpha \qquad (1)$$

As understood from the formula (1), a value of $\alpha$ is subtracted from threshold value $T_{th}$ compared to difference of temperature $\Delta T$ (=$T_2-T_1$). In other words, the magnitude of threshold value $T_{th}$ is varied depending on whether or not the vehicle 3 has run at a high load in a cold environment just before filling.

Here, the variation degree of the magnitude of threshold value $T_{th}$, that is, the magnitude of value of $\alpha$ may be set to a given value ($\alpha=10°$ C., for example), but instead may be varied in consideration of various conditions just before filling. By way of example, the magnitude of value of $\alpha$ (that is, the magnitude of the threshold value compared to difference of temperature $\Delta T$) may be varied depending on at least one of the state of consumption (specifications of the vehicle 3) of hydrogen gas in the vehicle 3, the running state and running area of the vehicle 3, and outdoor air temperature.

More specifically, by way of example, when the consumption of hydrogen gas per unit time in the vehicle 3 is higher, it is highly likely that the vehicle 3 runs at a load higher than when the consumption of hydrogen gas is lower, and thus tank temperature $T_2$ lowers. Thus, in this case, the magnitude of value of $\alpha$ is set greater than in the latter case.

In the above described example, the running state of the vehicle 3 means the maximum speed or average speed of the vehicle 3, for example. As these are increased, the magnitude of value of $\alpha$ is set greater. Further, it may be checked based on GPS or the like whether the running area of the vehicle 3 is in a cold region, whereby the magnitude of value of $\alpha$ is determined. These pieces of information are sent from the side of the vehicle 3 via communication to the hydrogen station 2 at the start of filling, and the hydrogen station 2 determines the magnitude of value of α suited to the individual pieces of information in the initial stage of filling.

Outdoor air temperature may be acquired by the outdoor air temperature sensor 8, so that the magnitude of value of α is determined based on the outdoor air temperature. Here, outdoor air temperature is also an index indicating locational conditions of the hydrogen station 2. The magnitude of value of α may also be varied according to the above described characteristics related to the fuel tank 30.

In the first variation described above, the following advantageous effect is added to the operation and effect of the above described embodiment; that is, when filling of hydrogen gas is performed after the vehicle 3 has run at a high load in a cold environment, also, presence/absence of abnormality of the temperature sensor 38 can be more accurately determined. Here, readout selection by the hydrogen station 2 from among the procedure shown in FIG. 4 and the procedure shown in FIG. 5 may be determined in consideration of the conditions before the start of filling. The conditions before the start of filling may be perceived based on the running state of the vehicle 3 or the consumption state of hydrogen gas, and on outdoor air temperature, for example.

<Second Variation>

Figure 6:
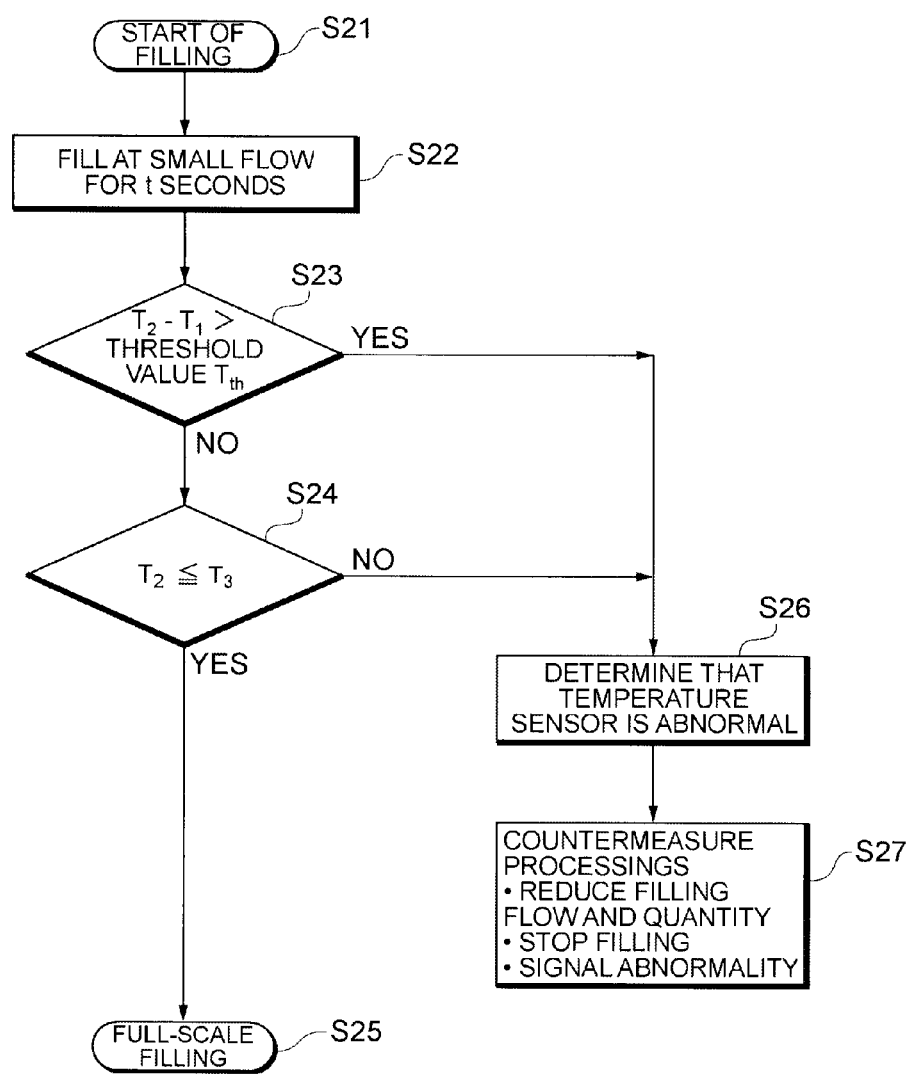
FIG. 6 is a flowchart showing a filling procedure of a second variation according to the embodiment.

The difference of a second variation illustrated in FIG. 6 from the above described embodiment (FIG. 4) lies in that determination of step S24 is performed. Steps S21 to S23 and S25 to S27 are the same as steps S1 to S6 and hence detailed explanation thereof is omitted here.

In this variation, when difference of temperature $\Delta T$ (=$T_2$−$T_1$) is equal to or smaller than threshold value $T_{th}$ (step S23; NO), tank temperature $T_2$ is further compared to outdoor air temperature $T_3$ (step S24). This outdoor air temperature $T_3$ is based on results acquired by the outdoor air temperature sensor 8 in the initial stage of filling.

To be more in detail, in the initial stage of filling, tank temperature $T_2$ is equal to a temperature (−20° C. in the above example) being the result of cooling by the precooler 16. Unless in a significantly cold environment, tank temperature $T_2$ is lower than outdoor air temperature $T_3$ in the initial stage of filling. Thus, in this variation, when tank temperature $T_2$ exceeds outdoor air temperature $T_3$ (step S24; NO), while difference of temperature $\Delta T$ is equal to or smaller than threshold value $T_{th}$, the determination unit 63 determines that the temperature sensor 38 is abnormal (step S26). Then, the operation control unit 64 executes required countermeasure processings (step S27). On the contrary, when tank temperature $T_2$ is equal to or smaller than outdoor air temperature $T_3$ (step S24; YES), the determination unit 63 determines that the temperature sensor 38 is normal, and then the operation control unit 64 performs the full-scale filling (step S25).

In this way, in the second variation, tank temperature $T_2$ is compared not only to supply temperature $T_1$ but also to outdoor air temperature $T_3$. Thus, determination of presence/absence of abnormality of the temperature sensor 38 can be improved in accuracy. It is to be understood that the second variation may also be applied to the first variation.

<Third Variation>

Figure 7:
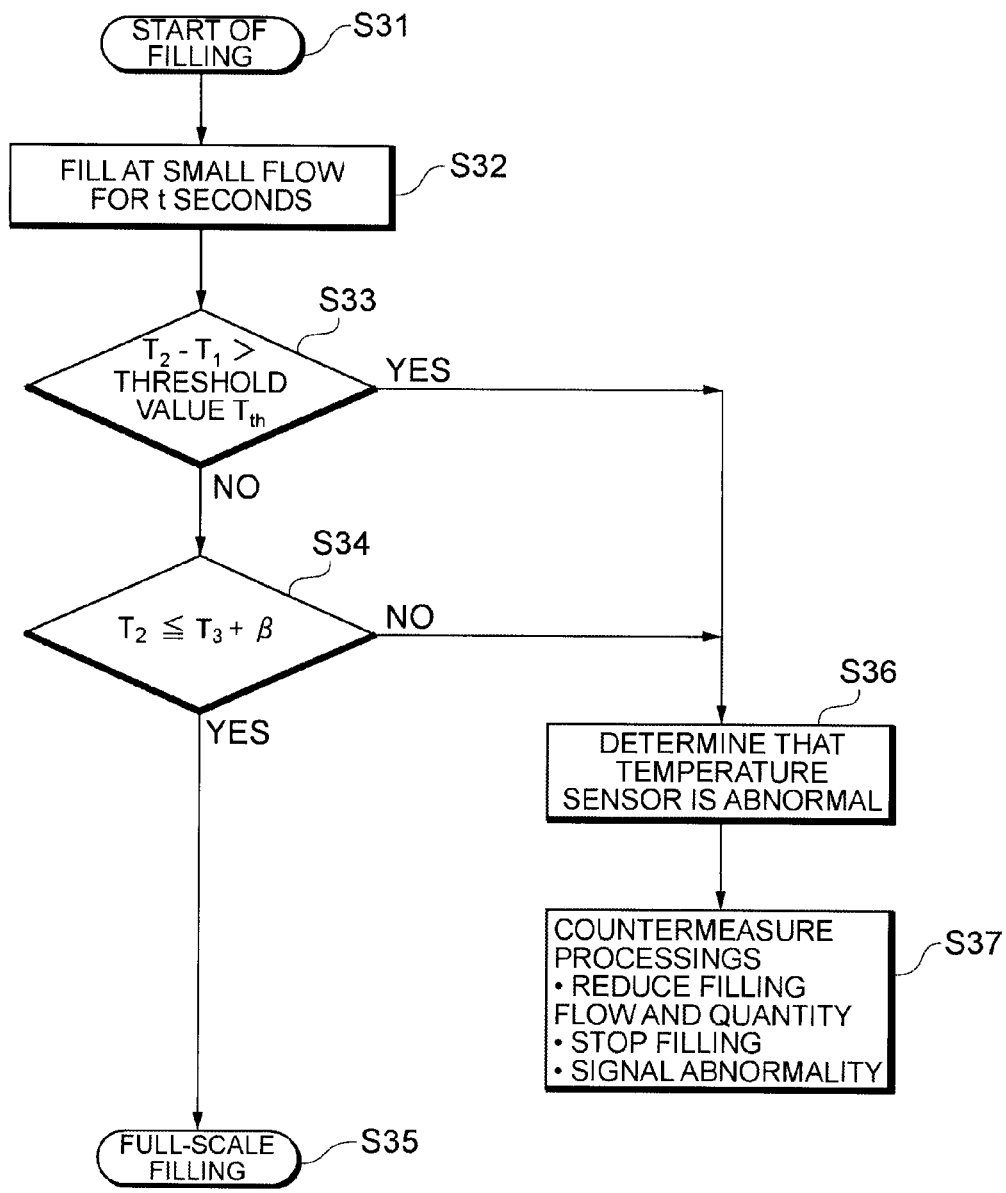
FIG. 7 is a flowchart showing a filling procedure of a third variation according to the embodiment.

The difference of a third variation illustrated in FIG. 7 from the second variation lies in that step S24 is replaced with step S34. The other steps are the same as those of the second variation and hence detailed explanation thereof is omitted here.

In step S34, a plus value β is added to outdoor air temperature $T_3$ compared to tank temperature $T_2$. The magnitude of plus value β may be set to a given value (5° C., 10° C. or the like), but instead may be varied.

Here, as the reasons why a plus value β may well be added to outdoor air temperature $T_3$, the following four factors are to be considered.

The first factor is a rise of gas temperature of the inside of the fuel tank 30 caused by filling. More specifically, when filling is performed at the above described low speed, the temperature of the inner side of the fuel tank 30 is suppressed from rising, but a small rise of temperature may occur. In this case, the degree of rise of temperature varies depending on heat radiation characteristics or the like of the fuel tank 30. Accordingly, the magnitude of plus value β is preferably varied depending on the heat radiation characteristics of the fuel tank 30.

The second factor is the temperature of environment in which the fuel tank 30 has been placed just before filling. By way of example, when filling is performed immediately after the vehicle 3 has been moved out from a heated garage at midwinter, tank temperature $T_2$ may be higher than outdoor air temperature $T_3$ in the initial stage of filling. When filling is performed immediately after the vehicle 3 has been placed in the sunshine at midwinter or at midsummer, also, tank temperature $T_2$ may be higher than outdoor air temperature $T_3$ in the initial stage of filling. Accordingly, plus value β is preferably set in consideration of these conditions.

The third factor is the presence of thermal sources in the vicinity of the location of placement of the fuel tank 30. When there are such thermal sources, also, tank temperature $T_2$ may be higher than outdoor air temperature $T_3$ in the initial stage of filling.

The fourth factor is geographical conditions of the hydrogen station 2. By way of example, when the hydrogen station 2 is in a low-temperature environment in which the outdoor air temperature is lower than a temperature (−20° C. in the above example) at which hydrogen gas is cooled by the precooler 16, also, tank temperature $T_2$ may be higher than outdoor air temperature $T_3$ in the initial stage of filling.

In this way, in the third variation, in the determination of step S34, tank temperature $T_2$ is not simply compared to outdoor air temperature $T_3$, but plus value β is added to outdoor air temperature $T_3$. Thus, determination of presence/absence of abnormality of the temperature sensor 38 can be improved in accuracy as compared to when the second variation is applied. It is to be understood that the third variation may also be applied to the first variation.

<Fourth Variation>

A fourth variation relates to a variation of the first to third temperature acquiring units according to the above described embodiments, and may also be applied to the first to third variations.

Regarding the First Temperature Acquiring Unit

A unit other than the communication device 6 may be used as the first temperature acquiring unit which acquires information on tank temperature $T_2$. By way of example, an input device used by a filling operator to manually input detection results of the temperature sensor 38 to the hydrogen station 2 may be used as the first temperature acquiring unit.

Regarding the Second Temperature Acquiring Unit

The temperature sensor 10 mounted in the filling nozzle 12 is used as the second temperature acquiring unit which acquires information on tank temperature $T_1$; but instead, a temperature sensor mounted in a place other than the filling nozzle 12 may be used. By way of example, a temperature sensor mounted in a pipe (a part of the gas flow path 13) very close to the filling nozzle 12 may be used.

In another example, a temperature sensor may be used which is mounted in the filling flow path 34 on the side of the vehicle 3. This is because the temperature of hydrogen gas just before being discharged into the fuel tank 30 is substantially equal to that of hydrogen gas supplied by the hydrogen station 2 to the fuel tank 30. In this case, a communication device (the communication device 6, for example) which acquires via communication, detection results of the temperature sensor mounted in the filling flow path 34 corresponds to the second temperature acquiring unit disposed in the hydrogen station 2.

Regarding the Third Temperature Acquiring Unit

The outdoor air temperature sensor 8 on the side of the hydrogen station 2 is used as the third temperature acquiring unit which acquires information on outdoor air temperature; but instead, an outdoor air temperature sensor mounted on the side of the vehicle 3 may be used. In this case, a communication device (the communication device 6, for example) which acquires via communication, detection results of the outdoor air temperature sensor mounted on the side of the vehicle 3 corresponds to the third temperature acquiring unit disposed in the hydrogen station 2.

INDUSTRIAL APPLICABILITY

The fuel gas station, the fuel gas filling system and the fuel gas supplying method according to the present invention may be used not only for hydrogen gas but also for another type of fuel gas such as natural gas. Further, the inventive fuel gas station, fuel gas filling system and fuel gas supplying method may be used not only in a vehicle but also in a movable body such as an airplane, ship or robot, which is provided with a fuel tank filled with fuel gas from the outside.

REFERENCE SIGNS LIST

1: fuel gas filling system
2: fuel gas station
3: vehicle
5: control device
6: communication device (first temperature acquiring unit)
8: outdoor air temperature sensor (third temperature acquiring unit)
10: temperature sensor (second temperature acquiring unit)
30: fuel tank
38: temperature sensor
62: calculating unit
63: determination unit
64: operation control unit

The invention claimed is:

1. A fuel gas filling system comprising a movable body mounted with a fuel tank; and a fuel gas station which supplies fuel gas to the fuel tank, wherein the fuel gas station includes:
a first temperature acquiring unit which acquires information on temperature of the inside of the fuel tank;
a second temperature acquiring unit which acquires information on temperature of fuel gas which the fuel gas station supplies to the fuel tank;
a calculation unit which calculates based on results acquired by the first temperature acquiring unit and the second temperature acquiring unit after supplying of fuel gas for a predetermined length of time, a difference of temperature between the temperature of the inside of the fuel tank and the temperature of fuel gas supplied to the fuel tank;
a determination unit which determines that the information on temperature of the inside of the fuel tank is abnormal when the calculated difference of temperature exceeds a predetermined threshold value; and
an operation control unit which, when it is determined that the information on temperature of the inside of the fuel tank is abnormal, reduces at least one of the flow and the amount of fuel gas supplied to the fuel tank as compared to when the information on temperature of the inside of the fuel tank is normal.

2. A fuel gas station which supplies fuel gas to an external fuel tank, the station comprising:
a first temperature acquiring unit which acquires information on temperature of the inside of the fuel tank;
a second temperature acquiring unit which acquires information on temperature of fuel gas which the fuel gas station supplies to the fuel tank;
a calculation unit which calculates based on results acquired by the first temperature acquiring unit and the second temperature acquiring unit after supplying of fuel gas for a predetermined length of time, a difference of temperature between the temperature (hereinafter referred to as "tank temperature") of the inside of the fuel tank and the temperature (hereinafter referred to as "supply temperature") of fuel gas supplied to the fuel tank;
a determination unit which determines that the information on temperature of the inside of the fuel tank is abnormal when the calculated difference of temperature exceeds a predetermined threshold value; and
an operation control unit which, when it is determined that the information on temperature of the inside of the fuel tank is abnormal, reduces at least one of supply flow and supply quantity of fuel gas supplied to the fuel tank as compared to when the information on temperature of the inside of the fuel tank is normal.

3. The fuel gas station according to claim 2, wherein the operation control unit stops supplying fuel gas to the fuel tank when it is determined that the information on temperature of the inside of the fuel tank is abnormal.

4. The fuel gas station according to claim 2, wherein the predetermined threshold value varies according to characteristics related to the fuel tank.

5. The fuel gas station according to claim 2, wherein when the fuel tank is mounted in a movable body, the determined threshold value varies according to at least one of outdoor air temperature, the running state or the running area of the movable body, and the consumption state of fuel gas in the movable body immediately before fuel gas is supplied for the predetermined length of time.

6. The fuel gas station according to claim 2, wherein the first temperature acquiring unit and the second temperature acquiring unit acquire respective pieces of information on temperature when supplying of fuel gas for the predetermined length of time is performed at a supply flow smaller than when supplying is normally performed.

7. The fuel gas station according to claim 6, wherein when results acquired by the first temperature acquiring unit and the second temperature acquiring unit indicate that the tank temperature is lower than the supply temperature, the determination unit determines that the information on temperature of the inside of the fuel tank is abnormal.

8. The fuel gas station according to claim 2, further comprising a precooler which cools fuel gas supplied to the fuel tank; and a third temperature acquiring unit which acquires information on outdoor air temperature, wherein when results acquired by the first temperature acquiring unit and the third temperature acquiring unit after supplying fuel gas for a predetermined length of time indicate that the tank temperature exceeds the outdoor air temperature, the determination unit determines that the information on temperature of the inside of the fuel tank is abnormal.

9. The fuel gas station according to claim 2, wherein the first temperature acquiring unit acquires, as information on temperature of the inside of the fuel tank via communication, detection results of a temperature sensor disposed in the inside of the fuel tank.

10. The fuel gas station according to claim 2, further comprising a nozzle used to discharge fuel gas into the fuel tank, wherein the second temperature acquiring unit comprises a temperature sensor disposed in the nozzle.

11. A fuel gas supplying method by which a fuel gas station supplies fuel gas to a fuel tank lying outside the fuel gas station, the method comprising:
- a step of supplying fuel gas to the fuel tank for a predetermined length of time;
- a step which, in the supplying of fuel gas, detects a temperature of the inside of the fuel tank and a temperature of fuel gas supplied by the fuel gas station to the fuel tank and calculates a difference of temperature therebetween; and
- a step which, when the calculated difference of temperature exceeds a predetermined threshold value, determines that the detected information on temperature of the inside of the fuel tank is abnormal and reduces at least one of supply flow and supply quantity of fuel gas supplied to the fuel tank as compared to when the information on temperature of the inside of the fuel tank is normal.

* * * * *